(12) United States Patent
Siddaramanna et al.

(10) Patent No.: US 11,902,567 B2
(45) Date of Patent: *Feb. 13, 2024

(54) METHOD, SYSTEM AND APPARATUS FOR INTRA-REFRESH IN VIDEO SIGNAL PROCESSING

(71) Applicant: Texas Instruments Incorporated, Dallas, TX (US)

(72) Inventors: Mahant Siddaramanna, Bengaluru (IN); Yashwant Dutt, Bengaluru (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/706,607

(22) Filed: Mar. 29, 2022

(65) Prior Publication Data

US 2022/0224937 A1 Jul. 14, 2022

Related U.S. Application Data

(63) Continuation of application No. 16/989,921, filed on Aug. 11, 2020, now Pat. No. 11,303,924, which is a
(Continued)

(30) Foreign Application Priority Data

Nov. 8, 2011 (IN) .............................. 3813/CHE/2011

(51) Int. Cl.
*H04N 19/527* (2014.01)
*H04N 19/107* (2014.01)
(Continued)

(52) U.S. Cl.
CPC ......... *H04N 19/527* (2014.11); *H04N 19/107* (2014.11); *H04N 19/124* (2014.11); *H04N 19/167* (2014.11); *H04N 19/174* (2014.11)

(58) Field of Classification Search
CPC .. H04N 19/107; H04N 19/124; H04N 19/527; H04N 19/167; H04N 19/174
See application file for complete search history.

(56) References Cited

U.S. PATENT DOCUMENTS 4,651,206 A * 3/1987 Ohki ...................... H04N 19/61
375/E7.256
5,719,628 A * 2/1998 Ohki .................... H04N 19/107
348/411.1
(Continued)

*Primary Examiner* — Zaihan Jiang
(74) *Attorney, Agent, or Firm* — Carl G. Peterson; Frank D. Cimino

(57) ABSTRACT

A video codec for encoding a sequence of video frames divides a video frame area into number of row segments. The Video encoder selects a different set of row segments in each video frame in a set of video frames and encodes the selected set of row segments by intra-prediction. As a result, the selected part of the frame is intra-refreshed. The video codec limits the maximum value of the vertical global motion vector GMVy to zero and video codec adjust the number of row segments in the select set of row segments based on the height of the search range configured for the motion estimation. As a result, the video codec may not refer to an un-refreshed portion in the previous frame for encoding an already refreshed area of the current frame.

20 Claims, 6 Drawing Sheets

Related U.S. Application Data continuation of application No. 15/936,431, filed on Mar. 26, 2018, now Pat. No. 10,798,410, which is a continuation of application No. 13/670,729, filed on Nov. 7, 2012, now Pat. No. 9,930,360.

(51) Int. Cl.
*H04N 19/124* (2014.01)
*H04N 19/174* (2014.01)
*H04N 19/167* (2014.01)

(56) References Cited

U.S. PATENT DOCUMENTS

| | | | | |
|---|---|---|---|---|
| 6,002,802 A | * | 12/1999 | Chujoh | H04N 19/132 375/E7.218 |
| 6,782,135 B1 | * | 8/2004 | Viscito | H04N 19/14 375/E7.14 |
| 6,783,135 B1 | | 8/2004 | Viscito et al. | |
| 8,913,661 B2 | * | 12/2014 | Bivolarsky | H04N 19/107 375/240.26 |
| 2004/0066854 A1 | * | 4/2004 | Hannuksela | H04N 19/70 375/E7.199 |
| 2005/0008240 A1 | * | 1/2005 | Banerji | H04N 19/895 375/E7.262 |
| 2006/0002470 A1 | * | 1/2006 | Sakurai | H04N 19/159 375/E7.17 |
| 2006/0228034 A1 | * | 10/2006 | Mizuno | H04N 19/17 375/E7.182 |
| 2006/0256785 A1 | * | 11/2006 | Nagai | H04L 1/1887 370/252 |
| 2008/0101786 A1 | * | 5/2008 | Pozniansky | H04N 23/74 396/164 |
| 2008/0170615 A1 | * | 7/2008 | Sekiguchi | H04N 19/82 375/240.12 |
| 2008/0170627 A1 | * | 7/2008 | Yamada | H04N 19/172 375/E7.026 |
| 2008/0240589 A1 | * | 10/2008 | Hsu | H04N 23/68 382/236 |
| 2010/0080478 A1 | * | 4/2010 | Satou | H04N 19/174 382/236 |
| 2010/0246683 A1 | * | 9/2010 | Webb | H04N 19/895 375/E7.123 |
| 2011/0026596 A1 | * | 2/2011 | Hong | H04N 5/145 375/E7.123 |
| 2011/0243468 A1 | * | 10/2011 | Yatabe | H04N 19/61 382/236 |
| 2012/0063516 A1 | * | 3/2012 | Kwon | H04N 19/187 375/E7.125 |
| 2012/0106622 A1 | * | 5/2012 | Huang | H04N 19/14 375/E7.026 |

* cited by examiner

METHOD, SYSTEM AND APPARATUS FOR INTRA-REFRESH IN VIDEO SIGNAL PROCESSING

CROSS REFERENCES TO RELATED APPLICATIONS

This application is a continuation of U.S. patent application Ser. No. 16/989,921, filed Aug. 11, 2020, which is a continuation of U.S. patent application Ser. No. 15/936,431, filed Mar. 26, 2018, (now U.S. Pat. No. 10,798,410), which is a continuation of U.S. patent application Ser. No. 13/670,729, filed Nov. 7, 2012, (now U.S. Pat. No. 9,930,360), and claims priority from Indian patent application No. 3813/CHE/2011 filed on Nov. 8, 2011, all of which are hereby incorporated in their entirety by reference.

TECHNICAL FIELD

Embodiments of the present disclosure relate generally to signal processing and more specifically to method, system and apparatus for intra-refresh in video signal processing.

RELATED ART

Video signal processing generally includes encoding and/or decoding of a video signal comprising a sequence of images or frames. In general, each frame of the video signal is segmented/split into blocks (often referred to as macro-block) of suitable size for processing. Each block is compared with a reference block to generate a residual block having a lower energy level. The residual block is then quantised and encoded using techniques such as, but not limited, to entropy coding that requires fewer bits to represent the residual block.

The reference block is often predicted or estimated using one or more prediction techniques such as inter-prediction/motion estimation (ME) and intra-prediction. In the intra-prediction, a reference block is predicted by interpolating pixels within a frame. Thus, Intra-prediction uses information within the frame (spatial redundancy) to compress the frame/block. On the other hand, in the inter-prediction, a reference block is predicted by interpolating pixels of the previous frame in the sequence. Often, Inter-prediction is also performed using previous and future frames in the sequence. Thus, inter-prediction may use temporal redundancy to compress the frame/block as is well known in the art.

Often a frame in which all blocks are intra-predicted is referred to as Intra-frame (I-Frame). An I-frame may be decoded/reconstructed using the data within the frame. Similarly, a frame in which one or more blocks are inter-predicted is often referred to as predicted-Frame (P-frame). When both previous and future frames are used for prediction, the frame often referred to as bidirectional (B-Frame). A P-frame or a B-frame may be decoded or reconstructed using a previous frame and/or future frame.

In general, a sequence of P/B-frames are transmitted. Since each P-frame or B frame carries the data for next frame in the sequence, an error may propagate through the frames. Often, an Intra frame is inserted in the sequence to stop the propagation of error.

SUMMARY

According to an aspect of the present disclosure, a video codec for encoding a sequence of video frames divides a video frame area into number of row segments. The video encoder selects a different set of row segments in each video frame comprised in a set of video frames and encodes the selected set of row segments by intra-prediction and other row segments by inter-prediction/intra prediction. As a result, the selected part of the frame is intra-refreshed.

According to another aspect of the present disclosure, video codec limits the maximum value of the vertical global motion vector GMVy to zero and video codec adjust the number of row segments in the selected set of row segments based on the height of the search range configured for the motion estimation. As a result, the video codec may not refer to an un-refreshed portion in the previous frame for encoding an already refreshed area of the current frame.

According to another aspect of the present disclosure, video codec selects the slice boundary same as the boundary of the selected set of row segments and disables the loop filter filtering the slice boundary in the refresh duration.

According to another aspect of the present invention, the video codec adjust the priority level of the selected set of row segments to high and gradually varies (reduces) priority level giving smooth transition to the encoding quality in the frame. Video codec may disable quantisation modulation between the rows of macro-blocks in the selected set of row segments.

Several embodiments are described below, with reference to diagrams for illustration. It should be understood that numerous specific details are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

DETAILED DESCRIPTION

Figure 1:
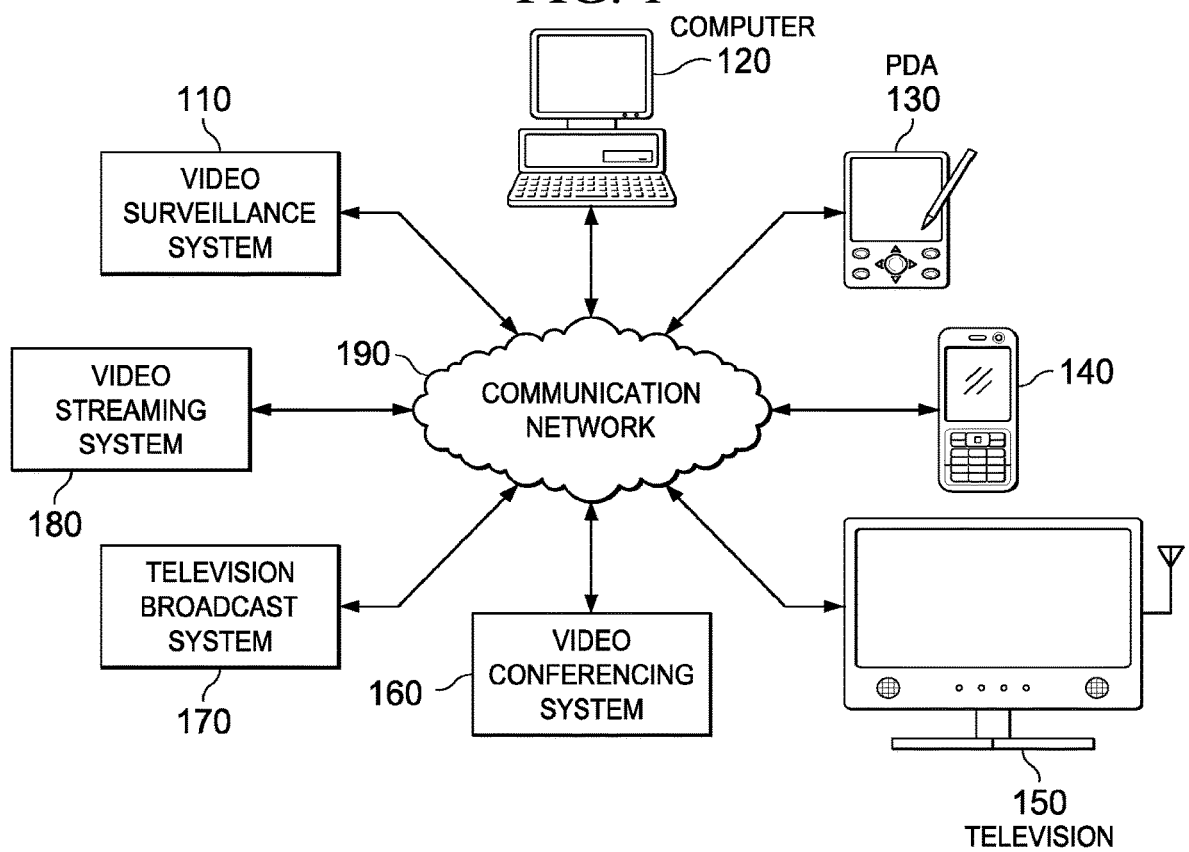
FIG. 1 is an example environment in which various aspect of the present disclosure may be seen.

FIG. 1 is an example environment in which various aspect of the present disclosure may be implemented. As shown, the environment may comprise, for example, one or more video surveillance system 110, computers 120, personal digital assistants (PDA) 130, mobile devices 140, televisions 150, video conference systems 160, TV broadcasting systems 170, video streaming systems 180, and communication networks/channels 190.

The video surveillance system 110 may be configured to take continuous pictures through one or more surveillance cameras. The surveillance cameras may generate digital video signal comprising sequence of image frames. The video surveillance system 110 may be configured to process the image frames for surveillance, efficient storage and/or for transmission over the communication network 190.

The computers 120, PDAs 130 and the mobile devices 140 may be configured to encode the video signals for transmission and to decode the encoded video signals received from the communication networks/channels 190. The video streaming system 180 may be configured to encode video signal and to transmit the encoded video signals over the communication networks/channels 190 responsive to a received request and/or asynchronously.

The television broadcast systems 170 may be configured to process video signals in accordance with one or more broadcast technologies and to broadcast the processed video signals over the communication networks/channels 190. The video conference systems 160 may be configured to receive a video signal from one or more participating/conferencing end-terminals (not shown) and to convert or compress the video signal for broadcasting or for transmitting to other participating user terminals.

The televisions 150 may be configured to receive encoded video signals from one or more different broadcasting centres (or channels). The television 150 may be further configured to decode each video signal and to display the decoded video signals on a display device (not shown). The televisions 150 may comprise set top box for decoding the video signals.

As shown in FIG. 1, the devices and systems 110-180 may be coupled to communication networks/channels 190. Communication networks/channels 190 may support an exchange of video signal encoded in accordance with one or more video encoding standards such as, but not limited to, H.263, H.264/AVC, and HEVC (H.265), for example. Accordingly, the devices and systems 110-180 may process (encode and/or decode) video signals complying with such standards. The systems and devices 110-180 may be implemented with one or more functional units that may be configured to perform signal processing, transmitting and/or receiving of video signals from communication networks/channels 190. An example implementation is described below in further detail.

Figure 2:
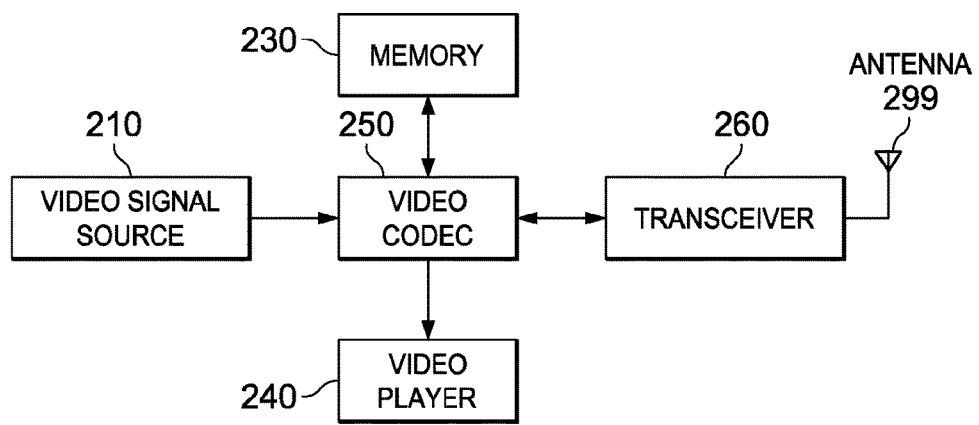
FIG. 2 is a block diagram illustrating exemplary functional units that may be operative within one or more of the exemplary devices/systems shown in FIG. 1.

FIG. 2 is a block diagram illustrating exemplary functional units that may be operative within one or more of the exemplary devices/systems shown in FIG. 1. The block diagram is shown containing a video signal source 210, a memory 230, a video player 240, a video codec (video encoder and decoder) 250 and a transceiver 260. Each functional unit shown in FIG. 2 is described in further detail below.

The video signal source 210 may be configured to provide a sequence of video frames in digitized form to the video codec 250 for encoding. The sequence of video frames may be provided as luminance (luma) samples, together with two corresponding chrominance (chroma) samples for a picture frame. The video signal source 210 may also be configured to provide samples of a monochrome picture coded using three separate color planes, as is well known in the art. The video signal source 210 may also be configured to provide video signals configured according to various video picture frame formats. The video frames provided by the video signal source 210 may also be provided in any other representation or formats suitable for encoding.

The memory 230 may be configured to store video signals for encoding or for subsequent playback. The memory 230 may receive the video signals from the video codec 250 or from other sources of video signals. The memory 230 may also be configured to store encoded video signals for transmission, and may be configured to store temporary or intermediate data during the processing of video frames. Memory 230 may comprise one or more types ROM (read only memory) and RAM (random access memory) for storing the data and program instructions.

The video player 240 may be configured to play decoded video from the video codec 250 and/or video stored in the memory 230. The video may be played on a display coupled to the device and/or other displays.

The transceiver 260 may be configured to transmit encoded signals over the communication networks/channels and to receive encoded video signals from communication networks/channels 190. The transceiver 260 may be further configured to modulate video signals for transmission and to demodulate video signals received from the communication networks/channels. The transceiver 260 may be further configured to adapt modulation and demodulation techniques in compliance with one or more communication standards.

The video codec 250 may be configured to encode video signals received from the memory 230 and/or from the video signal source 210 and to decode the encoded video signals received from the transceiver 260. The video codec 250 may be implemented on a digital signal processor (DSP) configured to execute program instructions or may be implemented as a dedicated integrated circuit (IC) configured to encode and decode video signals. The video codec 250 may be configured or implemented to encode and decode video signals in compliance with one or more communication standards. The decoding of encoded video signals may be implemented as the inverse of the encoding and is not described here for conciseness. Persons of ordinarily skill in the art may implement video codec 250 for decoding by reading the present disclosure.

Figure 3A:
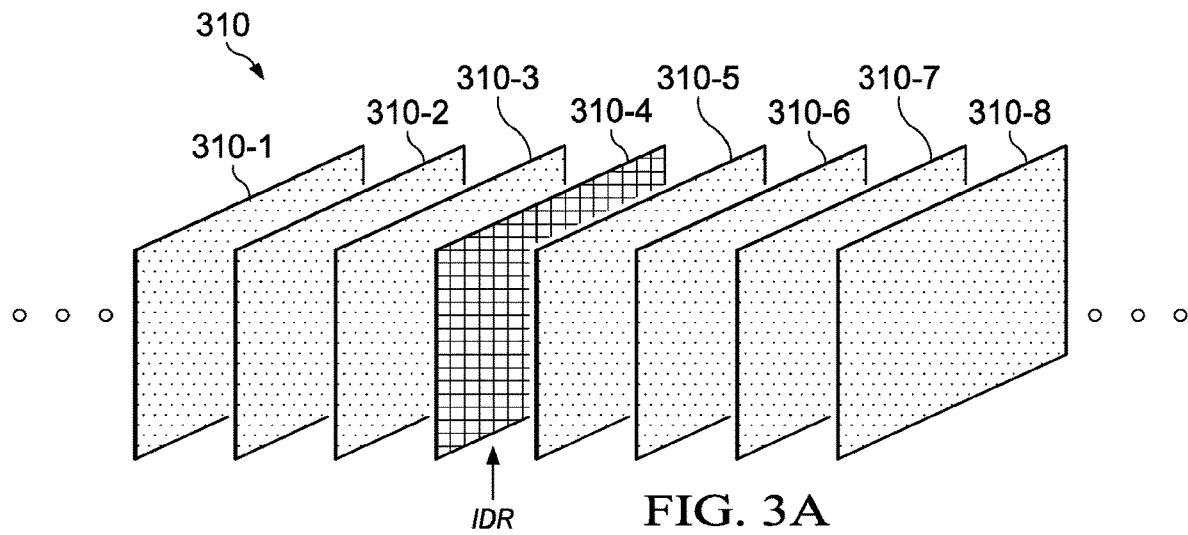
FIG. 3A is an example sequence of encoded video frames output from a prior video codec.

FIG. 3A is an example sequence of encoded video frames output from a conventional video codec. The sequence 310 is shown comprising frames 310-1 through 310-8 in which frames 310-1 through 310-3 and 310-5 through 310-8 may be encoded as P-frames and frame 310-4 is encoded as I-frame. Every P frame 310-1 through 310-3 and 310-5 through 310-8 may be encoded/decoded by using the information in the respective previous frame. For example, frame 310-2 is encoded using the information in frame 310-1.

Since frame 310-4 is encoded as I frame, errors in P-frames 310-1 through 310-3 may not propagate to the P-frames 310-5 through 310-8.

Figure 3B:
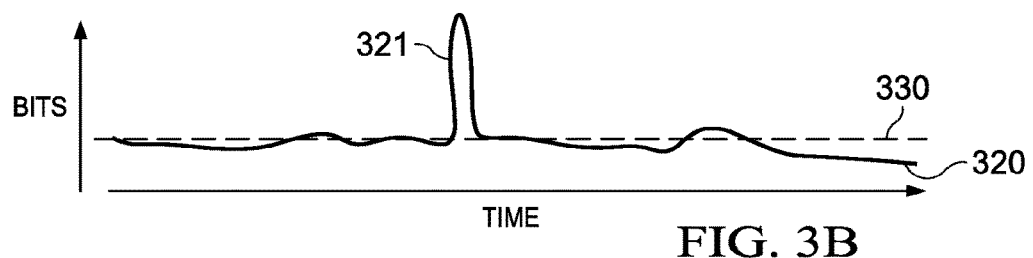
FIG. 3B is a graph illustrating example number of bits required for representing P-frames and the I-frame in the sequence.

FIG. 3B is a graph illustrating example number of bits required for representing P-frames and the I-frame in the sequence 310. As shown there, I-frame 310-4 is encoded with larger number of bits 321 compared to number of bits used for the P-frames 310-1 through 310-3 and 310-5 through 310-8. Such encoding pattern may cause undesired user experiences at the decoder. For example, insertion of I-frame may result in the increased bit rate for a small duration 321. Thus, whenever an I-frame is inserted in the sequence 310 for error refreshing, a large number of bits may be required to be transmitted in short duration over the channel. A channel having a fixed bandwidth may cause delay in receiving the entire I-frame thereby may cause undesired visuals effects at decoder as is well known in the art.

Figure 4A:
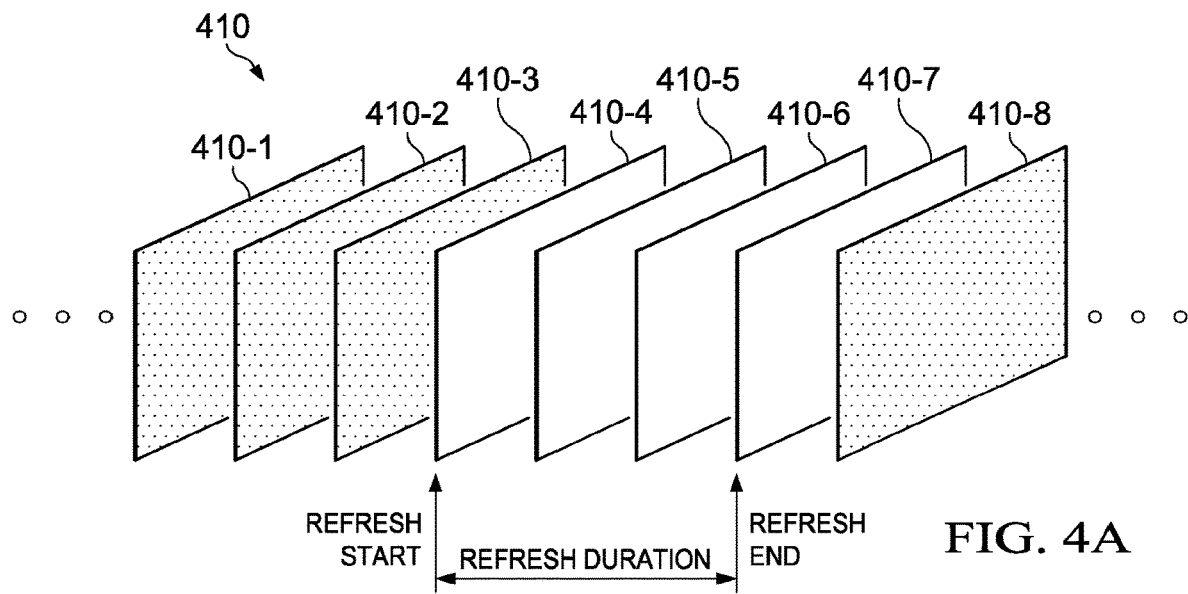
FIG. 4A is an example sequence of the frames encoded by the video codec 250 in one embodiment of the present disclosure.

FIG. 4A is an example sequence of the frames encoded by the video codec 250 in one embodiment of the present disclosure. The sequence 410 is shown comprising frames 410-1 through 410-8 in which frames 410-1 through 410-3 and 410-8 may be encoded as P-frames. Frames 410-4 through 410-7 may be encoded by using intra-prediction for one part of the frame and Inter-prediction for the remaining part of the frame. As a result, only intra-predict part in each frame 410-4 through 410-7 may be refreshed (at a time). Frames 410-4 through 410-7 are referred to as part-refreshed frames in this disclosure. Thus, by appropriately selecting the different parts for intra-prediction in frames 410-4 through 410-7, entire frame area may be (intra) refreshed and the propagation of error may be prevented. The number of frames from start of refresh 410-4 to end of refresh 410-7 is referred to as refresh duration. Thus, the bits required to Intra-refresh the frame area may be effectively distributed over N (In this example N=4) number of frames or refresh duration.

Figure 4B:
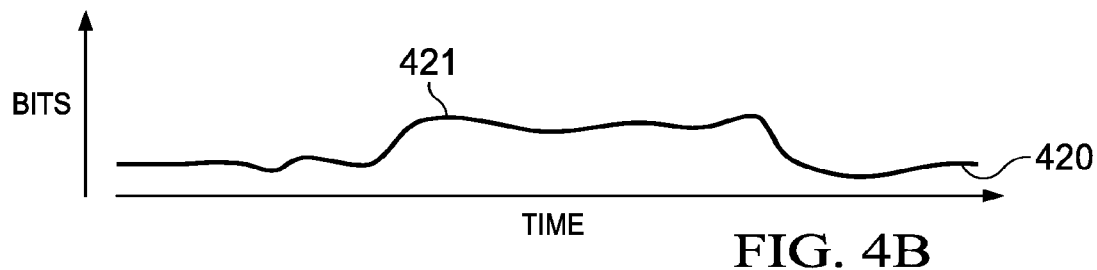
FIG. 4B is a graph illustrating example number of bits required for representing P-frames and the part-refreshed frames in the sequence.

FIG. 4B is a graph illustrating example number of bits required for representing P-frames and the part-refreshed frames in the sequence 410. As may be seen the number of bits required to refresh a frame area is spread over four frames 410-4 through 410-7 thus reducing/maintaining the bit rate at substantially same (as against the peak bit rate 321 in the prior technique).

The part of the frame for refreshing may be selected by dividing the frames into blocks of N×N Pixels and set of blocks in a particular order/pattern may be selected for intra-prediction/intra-refresh. The Manner in which video codec 250 selects part of a frame for intra prediction is described in further detail below.

Figure 5:
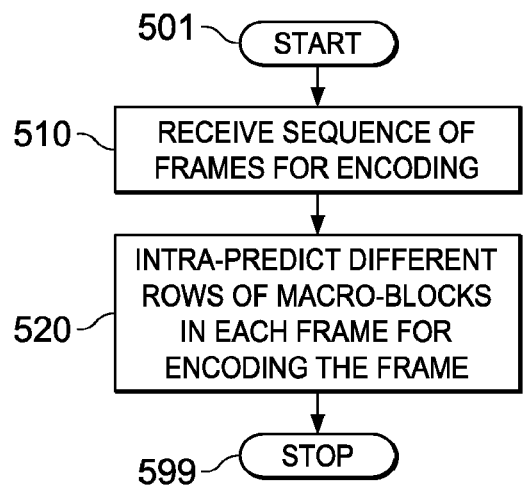
FIG. 5 is a flowchart illustrating the manner in which part of the frame may be selected for intra-prediction in one embodiment.

FIG. 5 is a flowchart illustrating the manner in which part of a frame may be selected for intra-prediction (to Part-refresh). Flowchart begins in block 501 and control passes to block 510.

In block 510, video codec 250 receives sequence of frames for encoding. The codec may select a set of frames from the sequence of frame received for part refreshing. The number of frames in the set of frame may be determined based on the refresh duration set by the user. Alternatively, number of frames for part refreshing may be configured.

In block 520, video codec 250 intra-predicts different set of rows of macro-blocks in each frame selected in step 510 for encoding the frame (part-refresh). In one embodiment, the codec may select the rows of macro-blocks according to the raster scan order. The raster scan order often refers to successively selecting a row below a previously selected row. The codec may select one or more consecutive rows of macro-blocks in each frame based on the refresh duration set by the user. In each frame, rows that are not intra-predicted (unselected) may be encoded using inter-prediction and or intra-prediction. The flow chart ends in block 599. The flow chart is further illustrated with an example below.

Figure 6:
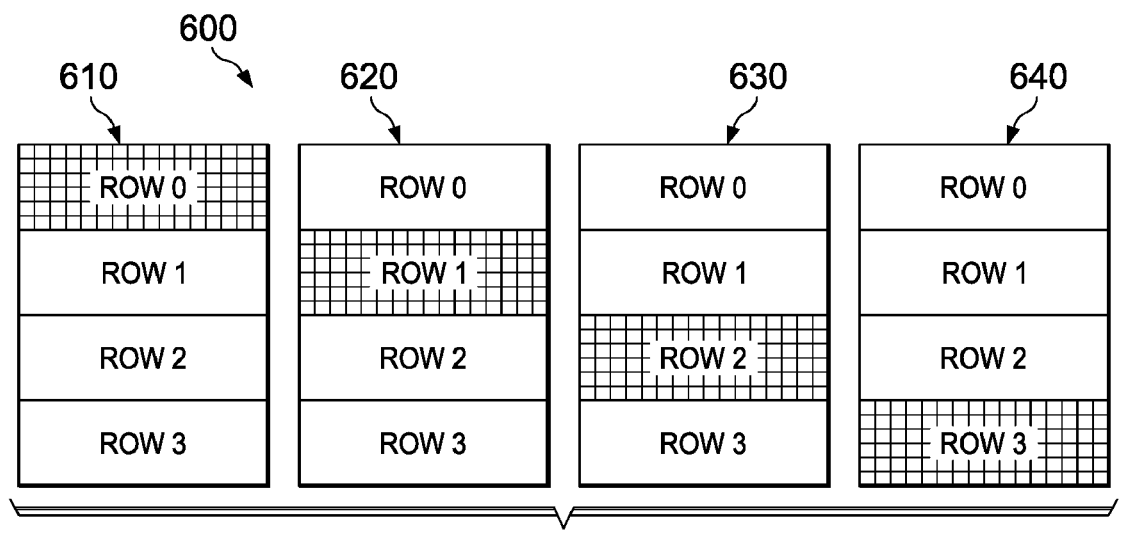
FIG. 6 is a diagram depicting example sequence of encoded frames 600 in which one part of each frame is encoded by intra-prediction.

FIG. 6 is a diagram depicting example sequence of encoded frames 600 in which one part of each frame is encoded by intra-prediction. Each frame 610 through 640 (610 being earliest in the sequence) is shown divided into four row segments (referred to as rows) row 0 through row 3 as an example. Each row may comprise one or more rows of macro-blocks (MBs) based on the frame size and/or macro-block size. For example, in a frame having a size of 960×1280 (rows×columns) pixels and macro-block of size 16×16 pixels, each row segment 601 through row 604 may comprise 15 rows of MBs. Alternatively, the number of row segments may be suitably selected based on the refresh duration set by the user. For example, frames may be divided into three rows if the refresh duration is set to 3 frames. As a further alternative, the row segments may be divided unequally with one or more row segments having more/less rows of macro-blocks. As a further alternative, the row segments may be overlapped.

Continuing with reference to FIG. 6, in frame 610, the video codec 250 encodes row 0 (example of part of the frame) using intra-prediction and remaining parts (rows 1 through 3) using inter-prediction. Since only a part of the frame is encoded using intra-prediction, the increase in the number of bits per frame for refreshing the frame area may be reduced. Similarly, in frames 620 through 640, the video codec 250 may respectively encode row 1, 2, and 3 using the intra-prediction. Thus, at the end of frame 640, the frame area may be completely refreshed and the propagation of error may be avoided.

However, row 0 in frame 620, row 0 and 1 in frame 630 and row 0, 1 and 2 in frame 640 may be encoded by inter-prediction. Thus, in order to effectively refresh the frame and to stop error propagation, row 0 in frame 620, row 0 and 1 in frame 630 and row 0, 1 and 2 in frame 640 may be inter-predicted from already refreshed part of the earlier/previous frame. For example, the row 1 in frame 630 may be inter-predicted from row 0 and row 1 of frame 620.

Often, various encoding parameters such as, but not limited to, global motion vector (GMV) and search region in motion estimation influence the codec to select a region in the previous frame for inter-prediction. Accordingly, the manner in which video codec 250 may be further configured to inter-predict a refreshed part of the frame without referring to/using an un-refreshed part in the previous frame is described below.

Figure 7A:
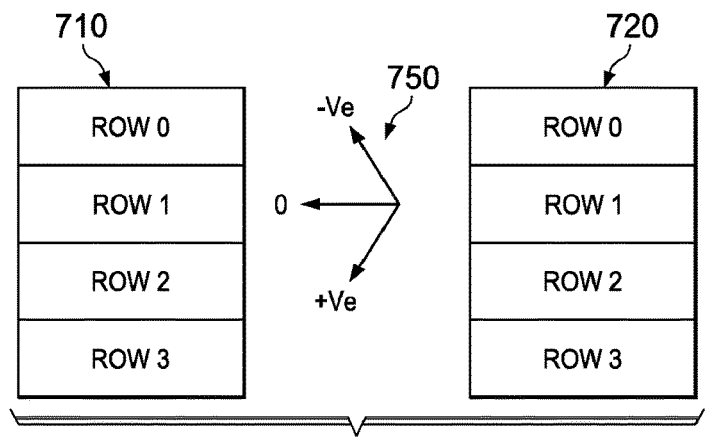
FIG. 7A illustrates example GMVy values configured to point to different region in the previous frame.

FIG. 7A illustrates example vertical component (Y-axis) GMV (GMVy) values configured to point to different region in the previous frame. In the figure, GMVy 750, for inter-predicting the row 1 of frame 720 is shown pointing to the previous frame 710. A positive GMVy is shown pointing to a region below the macro-blocks being inter-predicted (row 1 in this example). Similarly, a negative GMVy is shown pointing to a region above the macro-block being inter-predicted and a value zero may point to a region around the macro-block being inter-predicted.

Accordingly, in one embodiment, the video codec 250 may be configured to force/set/limit all positive values of GMVy to zero during the refresh period. As a result, GMVy may always point to the rows in the previous frame that are above the row being inter-predicted in the current frame. Since, intra-refresh is performed row wise in the raster scan pattern; the GMVy may point to a region that is already intra-refreshed. Thus, Inter-prediction of current row may be performed without referring to un-refreshed region (that are below the current row being inter-predicted).

Figure 7B:
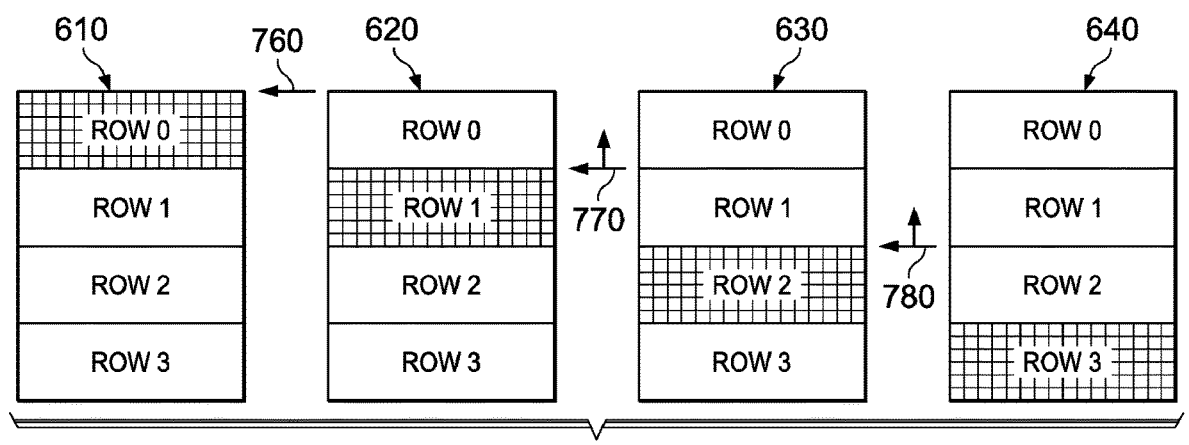
FIG. 7B illustrates an embodiment in which the GMVy value is limited to maximum zero for the intra-refresh pattern of FIG. 6.

FIG. 7B illustrates the GMVy with all positive value limited to zero for the intra-refresh pattern of FIG. 6. The GMVy 760 for inter-predicting the row 0 of frame 620 is shown pointing to already intra-refreshed row 0 of the previous frame 610. The GMVy 770 for inter-predicting the row 1 of frame 630 is shown pointing to already intra-refreshed row 0 and/or row 1 of the previous frame 620. Similarly, the GMVy 780 for inter-predicting the row 2 of frame 640 is shown pointing to already intra-refreshed row 0, row 1 and/or row 2 of the previous frame 630. Thus, by limiting the GMVy value to zero during the refresh period, the reference to un-refreshed part of the previous frame may be avoided while inter-predicting the refreshed macro-blocks. The horizontal (X-axis) component of GMV is not described for brevity, however, the person of an ordinary skill in the art may implement codec 250 with x-axis component of GMV when a video frame is divided vertically instead of rows.

The manner in which the video codec 250 may be further configured to inter-predict a refreshed part of the frame without referring to/using an un-refreshed part in the previous frame when the search range/area for motion estimation falls on/extends to the un-refreshed part of the previous frame is further described below.

Figure 8:
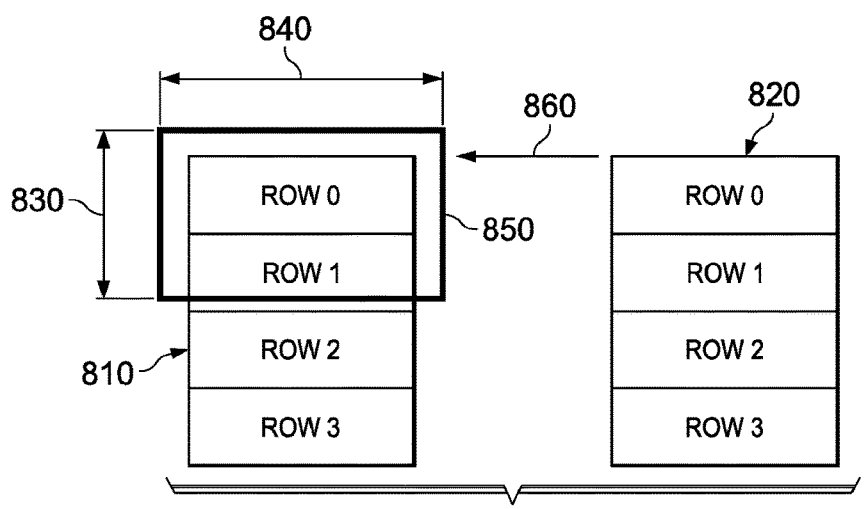
FIG. 8 illustrates an example search region for motion estimation or inter-prediction.

FIG. 8 illustrates an example search region for motion estimation or inter-prediction. The search range 850 is shown with a height 830 and width 840. The search region 810 may be determined based on one or more parameters such as but not limited to video quality and performance requirement of the video encoder, for example. In the figure, the GMVy 860 for row 0 of frame 820 is shown pointing to row 0 of frame 810. However the search range 850 is shown extending to the un-refreshed row 1 in the frame 810. Such extended search range may cause inter-coding of a refreshed macro block using un-refreshed macro-blocks in the previous frame.

Accordingly, in one embodiment, the video codec 250 may be configured to Intra-predict number of row segments based on the height of the search range 850 (to cover the search range). For example, if the search range height is greater than the height of the row segment, the codec may intra-refresh two or more rows in each frame within the refresh duration. Alternatively, the video codec 250 may be configured to dynamically divide the frame into fewer or larger number of rows based on the search range. As a further alternative, the video codec 250 may be further configured to selectively intra-predict number of rows to cover the search range 850.

Figure 9:
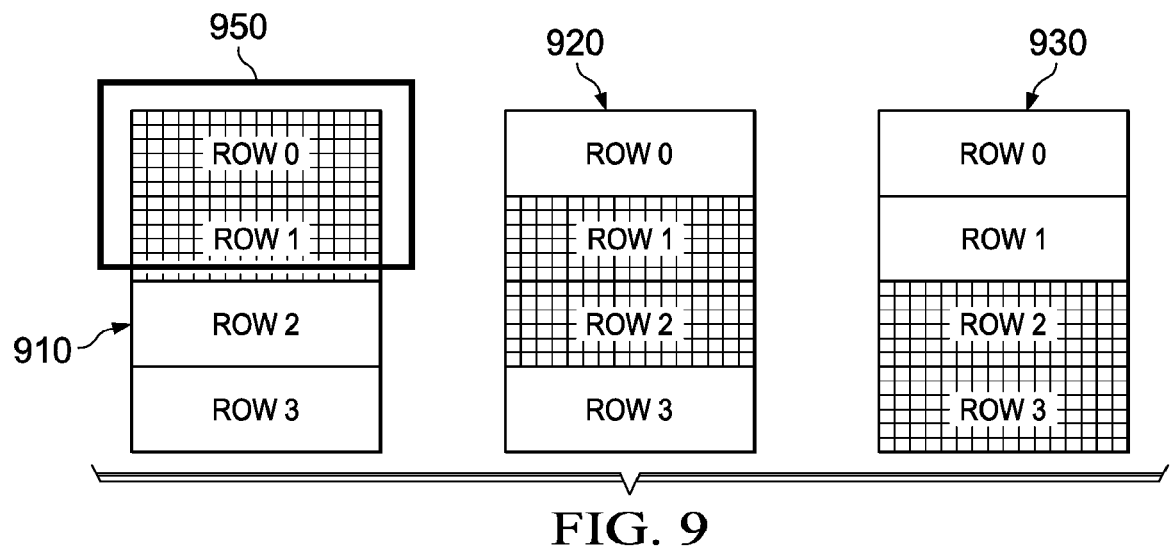
FIG. 9 illustrates the inter-prediction of rows based on the height of the search region in one embodiment.

FIG. 9 illustrates the inter-prediction of rows based on the height of the search region in one embodiment. The search range 950 is shown extending to two rows. Accordingly, the video codec 250 may encode two rows in each frame by Intra-prediction there by refreshing two rows in each frame. As an example, the video codec 250 may be configured for refreshing row 0 and row 1 in the frame 910, row 1 and row 2 in frame 920 and row 2 and row 3 in frame 930 as shown in FIG. 9. The over lapping of the intra refreshed rows may provide better intra-refresh and ensure that the search range may fall within the refreshed frame area.

The video codec 250 may be further configured to slice a frame in to a number of slices and each slice may be independently encoded and decoded without referring to other slices as well known in the art. The video codec 250 may also perform loop filtering of pixels around the slice boundary to reduce the boundary effect in the conjoined frame. The, undesirable effect of slicing and loop filtering of boundary pixels in Intra-refresh is further illustrated below.

Figure 10:
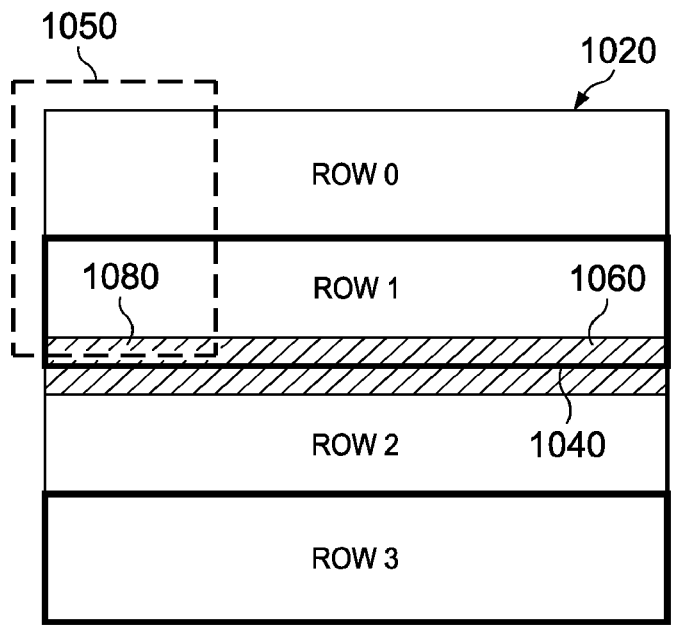
FIG. 10 is block diagram illustrating the effect of slicing and loop filtering in the intra-refresh.

FIG. 10 is block diagram illustrating the effect of slicing and loop filtering in the intra-refresh. The frame 1020 is shown sliced at 1040 dividing the frame 1020 into upper and lower halves. When the loop filter is applied, the boundary pixels 1040 and 1060 are modified based on the content of row 2 and row 1.

Considering that row 0 and row 1 are intra-refreshed, the filtering of the boundary pixel may modify some of the pixels in the intra-refreshed row 1 based on the un-refreshed row 2 content. Further, a codec may use modified pixels 1080 for inter predicting an already refreshed row (for example row 0 in the subsequent frame). Thus may cause undesirable error propagation.

In order to overcome at least some of the disadvantages, in one embodiment, the video codec 250 may be configured to perform row level slicing. For example, the video codec 250 may be configured to match slice boundary with the row segment boundary(s) at least in the refresh period. Further, the codec may be configured to disable the loop filter across slices in the refresh period. Since one row is encoded as one slice and filtering between the slices are disabled at least during the refresh period, the pixels in the search range 1050 or in the already refreshed rows (row 1) is unaffected.

The video codec 250 may be further configured to encode each frame with a desired number of bits. Such feature may be achieved by monitoring and controlling the bits used for encoding each row of macro-blocks. For example, if a particular row is encoded with a larger number of bits, the codec may increase the quantisation level for encoding subsequent rows of macro-blocks to ensure that the total number of bits used for encoding a frame is within the desired value. Further, the video codec 250 may be configured to encode a specific region of interest (ROI) of a frame with a high quality (with higher priority). For example, in case of news telecast, the news reader face region may be the ROI and may be encoded with higher quality (smaller quantisation level) than the other part of the frame.

However, row level rate control may cause undesirable top down scrolling effect in the intra refresh duration. For example, since row level rate control tries to achieve desired number of bits per frame, after intra-coding row 1, quantization parameter/level (QP) for row 2 may be set to higher value. Thus, in each frame, the rows below the Intra-coded row may be encoded with higher QP. Thus, the frames within the refresh duration may cause rolling effect when decoded and displayed. Manner in which the video codec 250 may be configured in the refresh duration to reduce the undesirable effect is described below in further detail.

Figure 11:
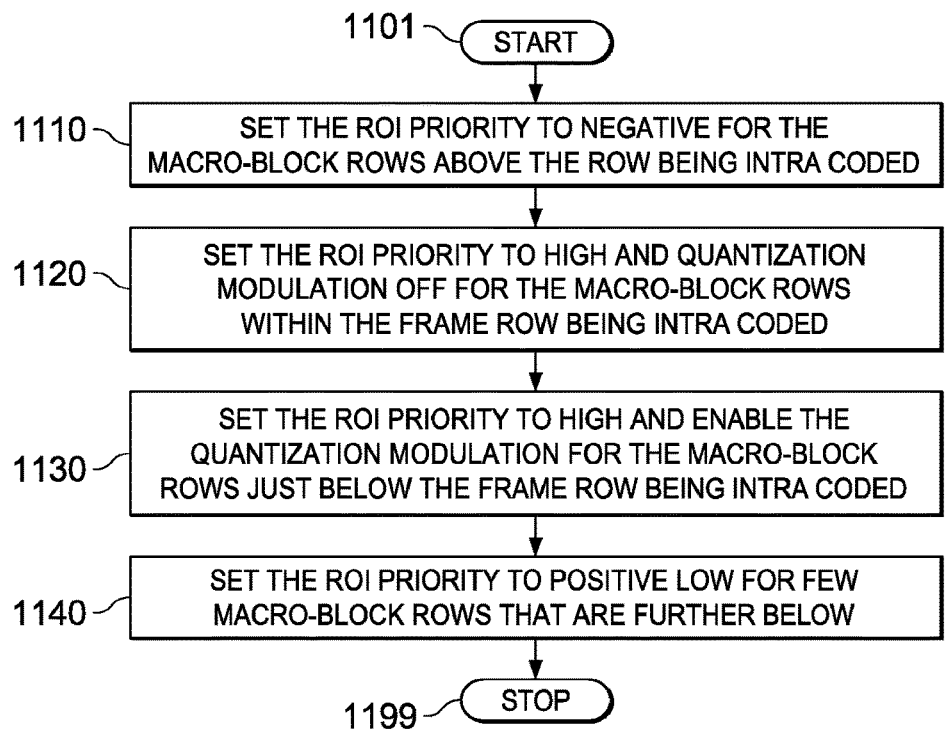
FIG. 11 is a flowchart illustrating the example configuration of the video codec in the refresh duration.

FIG. 11 is a flowchart illustrating the example configuration of the video codec 250 during the refresh duration. The flowchart begins in block 1101 and control passes to block 1110.

In block 1110, the video codec 250 sets the ROI priority to negative for the macro-block rows above the row being intra coded. Instead of a negative value, the video codec may set to any lower priority value. In block 1120, the video codec 250 sets the ROI priority to high and turn of the Quantisation modulation feature for the macro-block rows within the row segment being intra coded. The ROI priority may be set high by selecting the ROI as the current row being Intra coded. In block 1130, the video codec 250 may set the ROI priority to high and enables the Quantisation modulation for the macro-block rows just below the row segment being intra coded. In block 1140, the video codec 250 sets the ROI priority to positive low for few of the macro-block rows that are further below. The flow chart ends in block 1199

Figure 12:
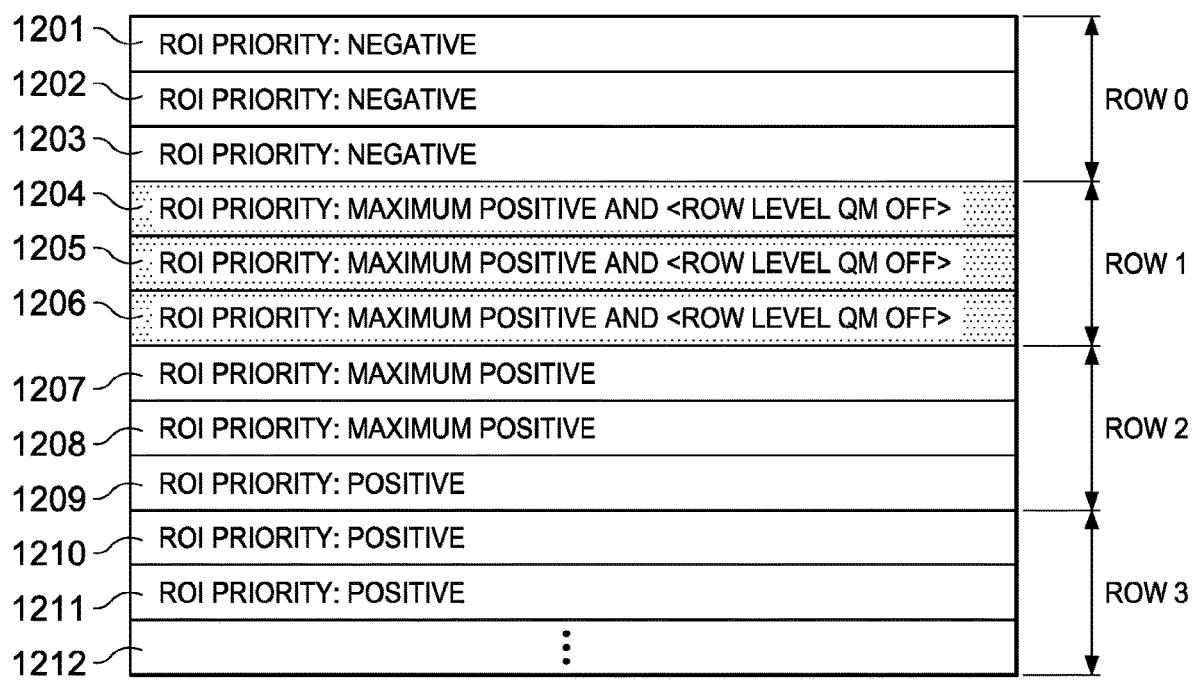
FIG. 12 illustrates configuration of the video codec for intra-refreshing row 1.

FIG. 12 further illustrate configuration of the video codec 250 for intra-refreshing row 1. The figure is shown with row 0 through row 3 and each row is shown comprising the rows of macro-blocks. For example, row 0 is shown comprising rows of macro-blocks 1201-1203, row 1 is shown comprising macro-block rows 1204-1206, row 2 is shown comprising rows of macro-blocks 1207-1209 and row 3 is shown comprising rows of macro-blocks 1210-1212. Considering the row 1 is being intra-coded (refreshed) in the refresh period, the video codec 250 may set negative ROI priority to rows of macro-blocks 1201-1203. The video codec 250 may set maximum ROI priority for the rows of macro-blocks 1204-1206 within the row 1 also may disable the quantisation modulation. Further, the video codec 250 may set the ROI priority to maximum for some of the macro-block rows (1207 and 1208 in this example) below the row 1. The video codec 250 may set the ROI priority value to positive low for few of the macro-block row further below. As a result, a smooth transition in the encoding quality is achieved thereby may eliminate the undesirable rolling effect during the refresh period.

While various examples of the present disclosure have been described above, it should be understood that they have been presented by way of example, and not limitation. Thus, the breadth and scope of the present disclosure should not be limited by any of the above-described examples, but should be defined in accordance with the following claims and their equivalents.

What is claimed is:

1. A method comprising:
   receiving, by an encoder, a plurality of frames including a first frame and a second frame;
   intra-predicting, by the encoder, a first row segment of the first frame;
   limiting, by the encoder, all positive values of a global motion vector to a zero value for a refresh duration; and
   inter-predicting, by the encoder, a second row segment of the second frame during the refresh duration,
   wherein the inter-prediction is based on the global motion vector pointing to the first row segment of the first frame.

2. The method of claim 1, further comprising dividing each of the plurality of frames into a plurality of row segments in raster scan order.

3. The method of claim 1, wherein limiting all positive values of the global motion vector to the zero value for the refresh duration includes limiting a maximum value of the global motion vector to the zero value for the refresh duration starting at the first frame in the plurality of frames and ending at a last frame in the plurality of frames.

4. The method of claim 1, wherein the refresh duration is a number of part-refreshed frames from a starting part-refreshed frame to an ending part-refreshed frame.

5. The method of claim 1, further comprising determining, by the encoder, a search range based on a video quality requirement of the encoder and a performance requirement of the encoder.

6. The method of claim 5, wherein the search range includes the first row segment of the first frame and the second row segment of the first frame.

7. The method of claim 6, further comprising:
   intra-predicting, by the encoder, the second row segment of the first frame.

8. The method of claim 1, further comprising:
   setting, by the encoder, a first region of interest (ROI) priority level to a negative ROI priority level for a row segment above a select row segment in one of the plurality of frames; and
   intra-predicting the select row segment.

9. The method of claim 8, further comprising:
   setting, by the encoder, a second ROI priority level to a maximum positive ROI priority level for the select row segment in one of the plurality of frames; and
   enabling quantization modulation.

10. The method of claim 9, further comprising:
    setting, by the encoder, a third ROI priority level to a positive ROI priority level for a row segment below the select row segment, wherein the positive ROI priority level is less than the maximum positive ROI priority level.

11. An encoder comprising one or more integrated circuits configured to:
    receive a plurality of frames including a first frame and a second frame;
    intra-predict a first row segment of the first frame;
    limit all positive values of a global motion vector to a zero value for a refresh duration; and
    inter-predict a second row segment of the second frame during the refresh duration,
    wherein the inter-prediction is based on the global motion vector pointing to the first row segment of the first frame.

12. The encoder of claim 11, wherein the one or more integrated circuits are further configured to divide each of the plurality of frames into a plurality of row segments in raster scan order.

13. The encoder of claim 11, wherein the one or more integrated circuits are configured to limit all positive values of the global motion vector to the zero value for the refresh duration by limiting a maximum value of the global motion vector to the zero value for the refresh duration starting at the first frame in the plurality of frames and ending at a last frame in the plurality of frames.

14. The encoder of claim 11, wherein the refresh duration is a number of part-refreshed frames from a starting part-refreshed frame to an ending part-refreshed frame.

15. The encoder of claim 11, wherein the one or more integrated circuits are configured to determine a search range based on a video quality requirement of the encoder and a performance requirement of the encoder.

16. The encoder of claim 15, wherein the search range includes the first row segment of the first frame and the second row segment of the first frame.

17. The encoder of claim 16, wherein the one or more integrated circuits are configured to intra-predict the second row segment of the first frame.

18. The encoder of claim 11,
    wherein the one or more integrated circuits are configured to set a first region of interest (ROI) priority level to a negative ROI priority level for a row segment above a select row segment in one of the plurality of frames; and
    wherein the select row segment is intra-predicted by the encoder.

19. The encoder of claim 18, wherein the one or more integrated circuits are configured to:
    set a second ROI priority level to a maximum positive ROI priority level for the select row segment in one of the plurality of frames; and
    enable quantization modulation.

20. The encoder of claim 19,
wherein the one or more integrated circuits are configured to set a third ROI priority level to a positive ROI priority level for a row segment below the select row segment, and
wherein the positive ROI priority level is less than the maximum positive ROI priority level.

\* \* \* \* \*